United States Patent Office 3,261,274
Patented July 19, 1966

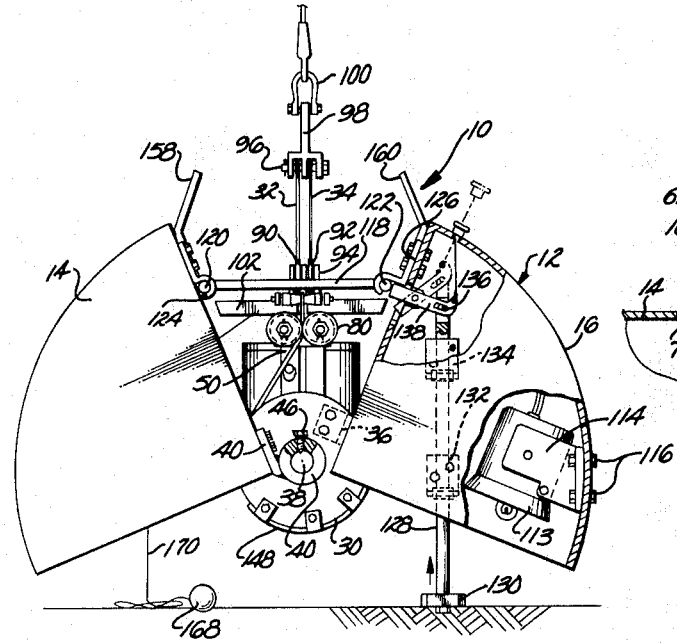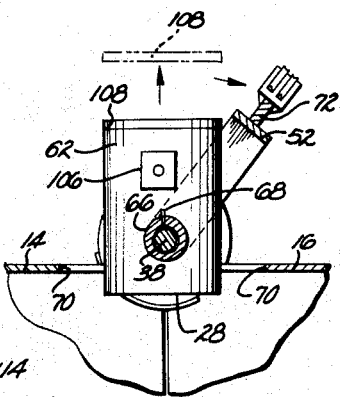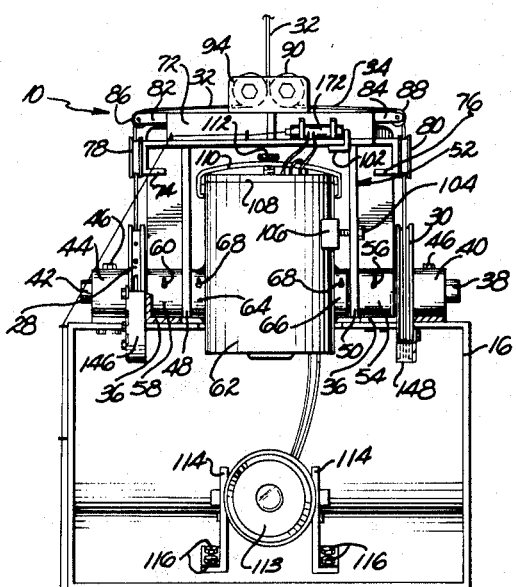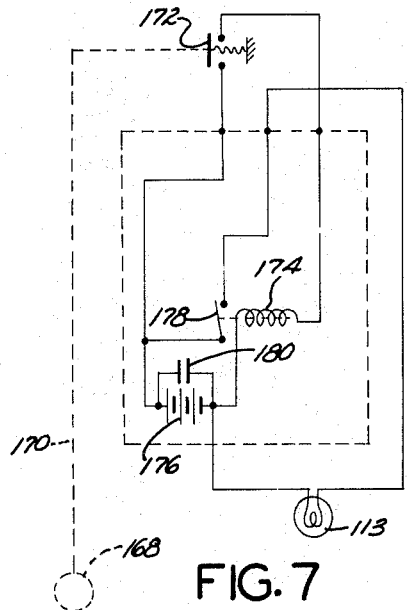
FIG. 2
FIG. 4
FIG. 3
FIG. 7
INVENTOR.
LOGAN O. SMITH
BY FULWIDER, PATTON,
RIEBER LEE & UTECHT
ATTORNEYS

3,261,274
UNDERWATER CAMERA AND RECOVERY
APPARATUS
Logan O. Smith, Redondo Beach, Calif., assignor to
Edgerton, Germeshausen & Grier, Inc., Bedford, Mass.,
a corporation of Massachusetts
Filed Sept. 16, 1963, Ser. No. 309,110
8 Claims. (Cl. 95—11)

The present invention relates to an underwater camera and recovery apparatus, and more particularly to such an apparatus which is adapted to recover samples of the subject matter photographed by the camera.

Although a great number of photographs have been accumulated of the bottoms of bodies of water, the scientific value of such photographs has been diminished by lack of accompanying information concerning the biological aspects of the subject matter photographed. In the absence of a suitable means for correlating such photographs with actual samples of the bottom, most biologists are reluctant to ascribe particular biological significance to such details as may appear in the photographs.

Photographs usually cover a much larger area of the bottom than do samples and thus they are more capable of showing continuity or patchiness of the fauna. They also can reveal the natural relationships of different kinds of animals to each other, to bottom materials, and also to microtopography such as burrows, debris piles, and tracks. On the other hand, actual samples, although greatly disturbed, recover specimens for precise identification and usually contain items such as animals which are too small to be visible on the photographs, including animals which live within the bottom and beyond the view of a camera.

It is desirable to take both the photographs and the bottom samples at the same time and at the same sites, but this has thus far been impractical with conventional equipment lowered in two separate operations. Moreover, navigational and other limitations prevent the precise relocation of any particular station or area of interest. In this regard, it is important that the precise station or area of examination be duplicated, since the fauna and bottom materials are not uniform over any great distance, as has been verified by successive bottom photographs and successive bottom samples. Thus, it has heretofore been impractical, if not impossible, to obtain any reliable correlation of bottom photographs and samples.

Accordingly, it is an object of the present invention to provide a camera and recovery apparatus which is adapted to photograph the bottom and obtain a sample of the photographed subject matter in one operation.

Another object of the present invention is to provide an apparatus of the aforementioned character which incorporates a camera within a grab bucket, and wherein the bucket is lowered in an opened state and the camera triggered by an actuator positioned to contact the bottom prior to the bucket. The samples subsequently recovered by the grab bucket are then raised to the surface for analysis and correlation with the photograph provided by the camera.

A further object of the invention is the provision of apparatus of the aforementioned character in which a bucket release apparatus engages the ocean bottom subsequent to operation of the camera, and which is effective to permit the bucket to be automatically closed when it is raised by cables running to a surface vessel.

Yet another object of the invention is to provide an apparatus of the aforementioned character in which the means supporting the camera upon the grab bucket can be quickly pivoted out of overlying relationship with respect to the camera so that the camera film magazine is quickly replaceable.

A further object of the invention is to provide an apparatus of the aforementioned character which includes opening tabs to which holding cables may be attached for opening of the bucket on the surface vessel through a slackening of the bucket lifting cables.

Another object of the invention is to provide an apparatus of the aforementioned character which is adapted to be lowered to the bottom in an open condition whereby triggering of the camera prior to contact of the bucket with the bottom provides an unimpeded view of the bottom, and wherein the bucket includes a pair of bucket halves which are automatically released relative to each other upon contact with the ocean bottom so that the bucket halves are urged by gravity to their closed position upon raising of the apparatus.

Another object of the invention is to provide an apparatus of the aforementioned character which is relatively inexpensive to manufacture, simple to operate, and relatively easy to maintain.

Other objects and features of the invention will become apparent from consideration of the following description taken in connection with the accompanying drawings, in which:

FIG. 2 is a side elevational view, on a diminished scale, of the apparatus of FIG. 1 in the open condition thereof, certain portions being cut away for clarity;

FIG. 3 is a view taken along the line 3—3 of FIG. 1;

FIG. 4 is an enlarged detail view of the camera and the structure for coupling the same to the grab bucket;

FIG. 5 is an enlarged view taken along the line 5—5 of FIG. 1;

FIG. 6 is a diagrammatic side elevational view of the present apparatus, illustrating the manner of dumping the bottom specimen into a specimen cart; and FIG. 7 is a wiring diagram of the circuitry for operating the camera of the apparatus.

Figure 1:
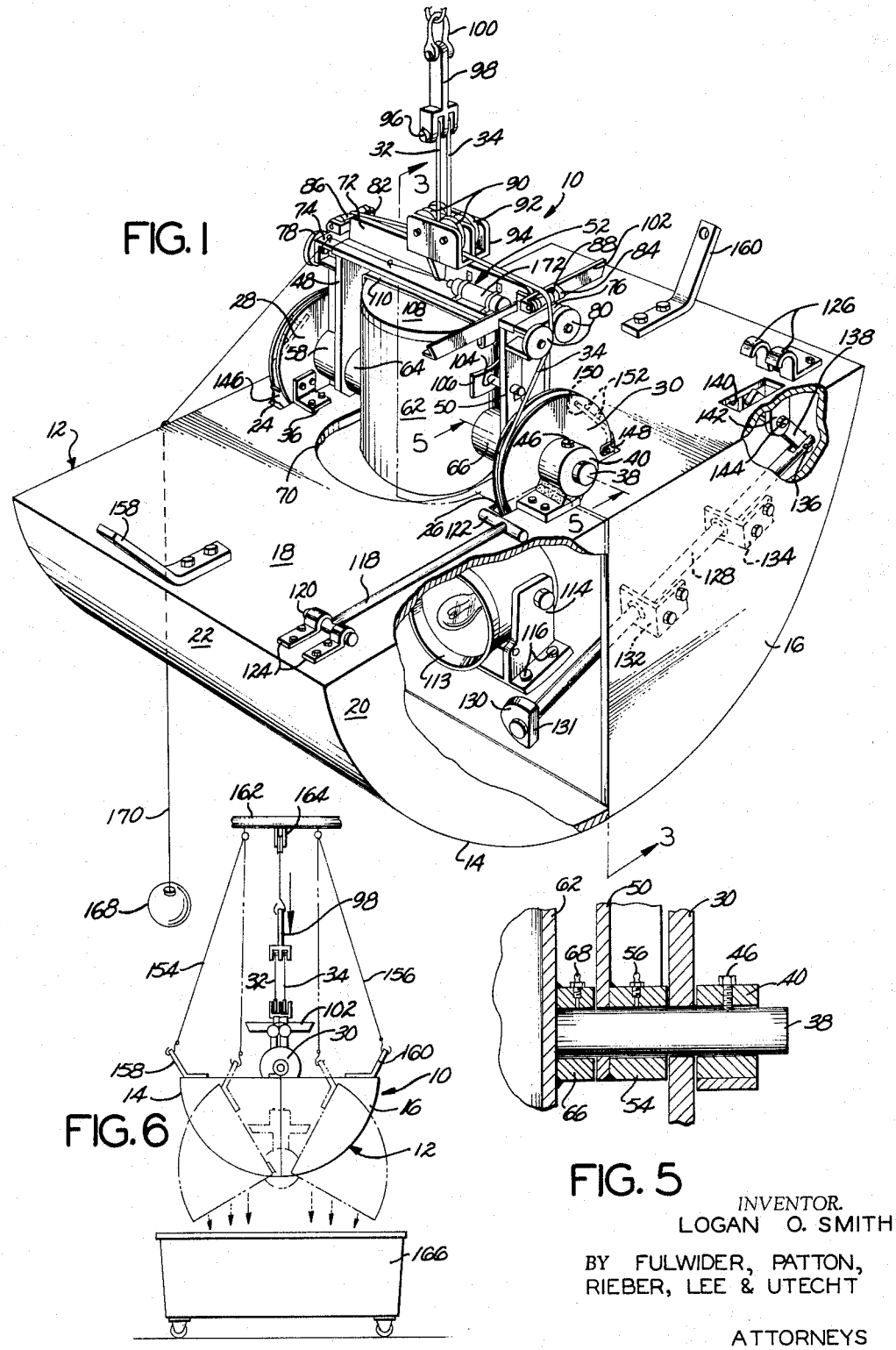
FIG. 1 is a perspective view of the camera and recovery apparatus according to the present invention, a portion thereof being cut away for clarity.

Referring now to the drawings, and particularly to FIGS. 1 through 3, there is illustrated a camera and recovery apparatus 10 comprising a bucket 12 which includes a pair of hollow, substantially identical bucket halves 14 and 16, each of which is preferably characterized by a cylindrical wedge configuration in which the dihedral angle is approximately 90°. Each of the bucket halves includes an upper wall 18, a pair of end walls 20, and an arcuate wall 22 extending between the end walls 20 and secured at its upper edge margin to the upper wall 18. The lower edge of the arcuate wall 22 and the inner edges of the end walls 20 define an open mouth or entry to the hollow interior of the bucket half, the hollow interiors of the pair of halves 14 and 16 forming a common, substantially water-tight chamber when the bucket halves are in the closed position illustrated in FIG. 1.

The upper walls 18 include a pair of confronting slots 24 at one end of the bucket 12 and a similar pair of slots 26 at the opposite end of the bucket 12 for receiving a pair of sheaves 28 and 30, respectively, whose grooved rims are adapted to receive the lower extremities of a pair of lifting cables 32 and 34, as will be described more particularly hereinafter.

One end of the bucket half 14 is fixed to the sheave 28 by an angle bracket 36 rigidly secured to the sheave 28 and to the upper wall 18 of the bucket half 14. The opposite end of the other bucket half 16 is similarly fixed to the sheave 30 by an identical angle bracket (not shown) secured to the sheave 30 and to the adjacent upper wall 18 of the bucket half 16. The other end of the bucket half 14 opposite the end thereof which is fixed to the sheave 28 is supported by a horizontal shaft 38 which is carried at its outer extremity within the central bore of a bucket mount 40 which is bolted to the upper wall 18 of the bucket half 14. Similarly, the end of the bucket half 16 opposite the end thereof which is fixed to the sheave 30 is supported by a horizontal shaft 42, which is axially aligned with the shaft 38 and carried at its outer extremity within the central bore of a bucket mount 44 bolted to the upper wall 18 of the bucket half 16, as best viewed in FIGS. 1, 3, and 5. The shafts 38 and 42 are prevented from rotating relative to the bucket mounts 40 and 44, respectively, by a pair of set screws or bolts 46 threadably disposed through the mounts 40 and 44 into forcible engagement with the shafts 38 and 42.

The shafts 38 and 42 are rotatably supported by a pair of opposite, laterally spaced apart, and vertically oriented legs 48 and 50 forming part of a support yoke 52. As seen in FIG. 5, the shaft 38 is rotatably supported within the central bore of an annular boss 54 which is welded to the lower extremity of the yoke leg 50, a grease fitting 56 being provided to afford lubrication. The shaft 42 is similarly supported by a boss 58 welded to the lower extremity of the opposite yoke leg 48, a grease fitting 60 being provided to afford lubrication, as best viewed in FIG. 3.

The sheave 28 is rotatably supported by the shaft 42 intermediate the bucket mount 44 and the boss 58, and the sheave 30 is rotatably supported by the shaft 38 intermediate the bucket mount 40 and the boss 54. Thus, one end of the bucket half 14 is pivotable relative to the sheave 30. Likewise, the bucket half 16 is fixed at one end to the sheave 30 and pivotable relative to the sheave 28 at the opposite end of the bucket half 16. As will be described more particularly hereinafter, this arrangement translates rotational movement of the sheave 28 into an opening, pivotal movement of the bucket half 14, simultaneous rotation of the sheave 30 effecting a similar opening, pivotal movement of the bucket half 16, whereby the bucket halves 14 and 16 move away from each other to permit bottom samples to be received in the hollow interior of the bucket 12.

The opposite or inner extremities of the shafts 38 and 42 rotatably support a cylindrical camera housing 62, and for this purpose are disposed within the central bores of a pair of bosses 64 and 66 which are welded diametrically opposite each other to the housing 62, suitable grease fittings 68 being provided to facilitate pivotal movement between the shafts and the bosses. It is also noted that the upper walls 18 of the bucket halves 14 and 16 are provided with a pair of complemental arcuate cutouts 70 to permit orientation of the camera housing 62 downwardly through the cutouts and into the hollow interior of the bucket 12.

The support yoke 52 includes a horizontally disposed, T-shaped support member 72 which is rigidly secured, as by welding, to the upper extremities of the yoke legs 48 and 50 for suspension thereof. As best viewed in FIGS. 1 and 3, a pair of channel-shaped end fittings 74 and 76 are rigidly secured to opposite ends, respectively, of the support member 72, the end fitting 74 rotatably supporting a pair of closely adjacent or abutting pulleys 78, and the end fitting 76 rotatably supporting a similar pair of closely adjacent or abutting pulleys 80, the pulleys 78 and 80 rotating in planes parallel to the planes of rotation of the sheaves 28 and 30.

A pair of pulley brackets 82 and 84 are rigidly secured to the ends of the vertical or upright section of the T-shaped support member 72, the brackets 82 and 86 rotatably supporting cable guides or rollers 86 and 88, respectively. The rollers 86 and 88 are located immediately above the pairs of pulleys 78 and 80, respectively, and train or guide the lifting cables 32 and 34 into position between the pairs of pulleys 78 and 80. The cables 32 and 34 extend inwardly from the rollers 86 and 88 along the longitudinal axis of the elongated support member 72, and are trained upwardly by disposition through another sheave arrangement.

More particularly, the cables 32 and 34 pass between pairs of closely adjacent sheaves 90 and 92, respectively, which are disposed in planes of rotation normal to those of the pulleys 78 and 80. The sheaves 90 are rotatably supported within one channel of a sheave mount 94, and the sheaves 92 are rotatably supported on the same shafts in an adjacent channel of the mount 94, the mount 94 being rigidly secured to the support member 72 by welding or the like.

The upper extremities of the lifting cables 32 and 34 include suitable end fittings (not shown) which are pivotally carried by a pin 96 carried at the lower extremity of a lifting member 98. The upper extremity of the lifting member 98 is coupled by a clevis 100 to a lifting chain or cable extending to the surface vessel (not shown) upon which is located the equipment for raising and lowering the apparatus 10. Since such hoist equipment is well known to those skilled in the art, a description thereof will be omitted for brevity.

At one extremity of the support member 72 is welded an elongated angle 102 which extends laterally from opposite sides of the support member 72. The angle 102 is beveled at its ends and serves as a stop to limit the opening movement of the bucket halves 14 and 16, and particularly prevents the bucket halves from engaging and possibly damaging the camera housing 62, as best illustrated in FIG. 2.

Although the camera housing 62 is pivotable about the inner extremities of the shafts 38 and 42, the housing 62 is normally maintained in a vertical or upright position by an arrangement which includes a bolt 104 disposed through the yoke leg 50 and threaded into a bracket 106 which is welded to the adjacent periphery of the camera housing 62.

The upper end of the cylindrical housing 62 is closed by a circular disk or cover 108 held in position by a strap 110. The strap 110 is characterized by an inverted U-shape, and its extremities include flanges which grip the undersides of a pair of integral studs extending from diametrically opposite sides of the housing 62 at the upper end thereof. The flanged extremities of the strap 110 are caused to grip the housing studs by a securing bolt 112 which is disposed through the mid-portion of the strap 110 and into engagement with the housing cover 108. Tightening of the bolt 112 urges the cover 108 into forcible engagement with the upper edge margin of the housing 62, and a suitable sealing means such as an O-ring (not shown) may be employed to render such engagement water-tight. With this arrangement, as best viewed in FIG. 4, access is provided to the camera (not shown) within the housing 62 for replacement of the film magazine or the like. That is, removal of the bolt 104 permits the support yoke 52 to be pivoted to one side so that the securing bolt 112 may be loosened to remove the cover 108.

A stroboscopic light 113 or similar source of illumination for the camera in the housing 62 is located in the bucket 16, as best viewed in FIGS. 2 and 3, being rigidly supported in appropriate position by a pair of support brackets 114 which are fixed to the interior surface of the arcuate wall 22 of the bucket half 16 by a plurality of bolts 116.

The bucket halves 14 and 16 are maintained in an open position during lowering of the apparatus 10 by an elongated latch member 118. The member 118 includes integral, transversely oriented holding rods 120 and 122 at opposite ends thereof, the lateral extremities of the rod 120 being pivotally mounted adjacent the outer edge margin of the bucket half 14 by a pair of brackets 124 which are suitably bolted to the upper wall 18 of the bucket half 14. The lateral extremities of the oppositely located rod 122 are adapted to be removably received within a pair of brackets 126 which are rigidly bolted to the upper wall 18 of the bucket half 16 adjacent the outer edge margin thereof, as best viewed in FIG. 2.

With the latch member 118 held within the brackets 126, the bucket 12 is in its open position preparatory to lowering thereof for photographing and sampling the ocean bottom. Just prior to contact of the bucket 12 with the ocean bottom, the member 118 is unlatched by a release mechanism comprising an elongated rod 128 which in its extended or unactuated position vertically depends from the bucket 12 during lowering thereof. The lower extremity of the rod 128 extends slightly below the lower edges of the open bucket 12, and includes an annular element 130 fixed to such lower extremity for engagement with the ocean bottom. The element 130 includes a flat side 131 for clearing the end wall 20 of the bucket half 16 upon retraction of the rod 128 to the actuated or release position thereof which is illustrated in FIG. 1.

As best viewed in FIG. 2, engagement of the element 130 with the ocean bottom urges the rod 128 upwardly, the upward movement of the rod 128 being slidably accommodated by a pair of rod supports 132 and 134 bolted to the inside of the end wall 20 of the bucket half 16. The upper end of the rod 128 is slotted and mounts a pin 136 for pivotally mounting in such slot the lower extremity of an elongated link 138, as best viewed in FIGS. 1 and 2. The upper extremity of the link 138 extends through a slot 140 provided in the upper wall 18 of the bucket half 16, the slot 140 being located between the pair of brackets 126 in underlying relationship to the latch member 118 when such member 118 is in its latched position in engagement with the brackets 126. A mounting tab 142 is welded to the underside of the upper wall 18 of the bucket half 16 adjacent an edge margin of the slot 140, and depends therefrom to mount a pin 144 which pivotally supports the link 138 intermediate the ends thereof.

With the bucket 12 open, the latch member 118 in its latched position, and the rod 128 in its extended position, all as illustrated in FIG. 2, the link 138 is oriented with the upper extremity thereof in engagement with the holding rod 122 of the latch member 118 and thus maintains the rod 122 in engagement with the brackets 126. In this regard, it is noted that the pin at the upper extremity of the rod 128 is movable within a slot in the lower extremity of the link 138 so as to provide for relative movement therebetween during pivotal movement of the link 138.

When the open bucket 12 is lowered, the annular element 130 contacts the ocean bottom and urges the rod 128 upwardly to retracted or release position, pivoting the link 138 and moving the upper extremity thereof out of engagement with the latch member 118. Subsequent engagement of the open bucket 12 with the ocean bottom upon continued lowering of the bucket 12 pivots the bucket halves 14 and 16 slightly upwardly to bring their upper walls 18 toward each other, relieving the tension on the latch member 118 so that the weight thereof causes it to fall out of engagement with the bracket 126 and pivot about the brackets 124.

Subsequently raising or hoisting of the bucket 12, with the latch member 118 in its release position out of engagement with the brackets 126, permits the bucket halves 14 and 16 to come together in a closing movement. Such closing movement is effected by utilizing the hoisting forces on the cables 32 and 34 to rotate the sheaves 28 and 30.

The hoisting cables 32 and 34, which pass about the sheaves 90 and 92, the cable rollers 86 and 88, and the pulleys 78 and 80 as previously described, are secured at the lower extremities to the sheaves 28 and 30. Thus, the lower extremity of the cable 32 is disposed within the grooved rim of the sheave 28 in a clockwise direction, as viewed in FIG. 2, and is maintained within the sheave groove by an arcuate flanged guard 146 which overlies a portion of the groove and is secured to one side of the sheave 28 by suitable fasteners passing through mounting tabs which are integral with the guard 146. Similarly, the lower end of the cable 34 is disposed within the grooved rim of the sheave 30, but in a counter-clockwise direction, a guard 148 similar to the guard 146 being attached to the sheave 30 to maintain the cable 34 within the groove of the sheave.

The lower ends of the cables 32 and 34 are each fixed within an elongated opening 150 provided in the respective sheave in communication with the sheave rim groove, the cable being fixed in the opening 150 by a pair of set screws (not shown) disposed through openings 152 which are also provided in the sheave. As illustrated, the openings 152 extend transversely of the opening 150 in communication therewith so that the set screws can bear against the cable in such opening.

With this arrangement, when the latch member 118 is disengaged from the brackets 126, hoisting forces on the lifting cables 32 and 34 impart a counter-clockwise rotation of the sheave 28 and a clockwise rotation of the sheave 30, as viewed in FIG. 1, whereby the bucket half 14 is pivoted by the sheave 28 in a counter-clockwise direction and the bucket half 16 is pivoted in a clockwise direction by the sheave 30 to close the bucket 12.

After raising or recovery of the apparatus 10 by the surface vessel, the bucket 12 is preferably dumped by attaching a pair of chains 154 and 156, as best viewed in FIG. 6, to a pair of lifting tabs 158 and 160 which are bolted to the upper walls 18 of the bucket halves 14 and 16 adjacent the outer side edges thereof. The upper ends of the chains 154 and 156 are attached to a suitable overhead structure 162 on the main deck of the surface vessel. The hoisting chain or cable attached to the lifting member 98 is trained about a pulley 164 rotatably carried by the structure 162, after the chains 154 and 156 are in position, and the tension on the hoisting cable is relieved. The weight of the bucket 12 is thus transferred to the chains 154 and 156, affecting a lifting on the tabs 158 and 160, and opening the bucket 12 to dump the contents thereof into a water-tight metal carrier 166 positioned beneath the bucket 12. The material in the carrier 166 is then processed, as by passing the same through a fine mesh screen, to permit analysis of the organisms therein.

Although considerable variation in the particular configuration of the bucket 12 is contemplated by the present invention, satisfactory results have been achieved with a bucket adapted to scoop or sample an area of approximately 0.56 square meter of ocean bottom. When full the bucket contains approximately 0.18 cubic meter of material, and weighs approximately 250 kilograms empty and approximately 500 kilograms full.

The particular type of camera utilized with the apparatus 10 is not an important feature of the present invention, although the camera must be adapted for underwater use and preferably should provide a large negative and include an easily interchangeable film magazine. One suitable arrangement for mounting the camera in the housing 62 includes a plate welded to the bottom of the housing 62 and having a central opening to receive a tapered cone of quartz through which the camera is sighted.

The actuation of the camera can best be understood from the following description of the operation of the apparatus 10. The bucket 12 is opened on the surface vessel, and locked in this position by locating the latch member 118 in engagement with the brackets 126. The bucket 12 is then lowered toward the ocean bottom. A trigger weight 168 is suspended from a trigger wire 170 a preset distance below the bucket 12, as for example, approximately 1.5 to 2.0 meters, and therefore contacts the ocean bottom slightly before the bucket 12. Such contact of the weight 168 with the ocean bottom relieves tension upon the supporting wire 170 which actuates a conventional spring-loaded mercury switch 172 to which the wire 170 is connected. The switch is preferably mounted to the yoke support member 72, and is conventional in form. As diagrammatically illustrated in FIG. 7, the tripping of this switch closes a circuit between a solenoid 174 and a battery 176 located in the housing 62 to thereby actuate the camera shutter, which is diagrammatically represented at 178. Closing of the switch 172 also closes the circuit to a capacitor 180 connected in parallel with the battery 176, the capacitor discharging to energize the light 113 for illumination of the ocean bottom immediately beneath the bucket 12. Other circuits for triggering the camera and its light source will immediately suggest themselves to those skilled in the art, the circuit shown therefore being merely exemplary.

Continued lowering of the bucket 12 brings the release rod 128 into contact with the ocean bottom, consequently pivoting the release link 138 so that the latch member 118 is subsequently released upon contact of the bucket halves 14 and 16 with the ocean bottom.

The weight of the bucket halves 14 and 16 scoops out the area of the ocean bottom photographed by the camera when the bucket 12 is raised, the hoisting forces on the cables 32 and 34 effecting closure of the bucket halves 14 and 16 through the sheaves 28 and 30, as previously described.

From the foregoing description, it will be apparent that the present apparatus 10 is adapted to effect simultaneous photographing and recovery of ocean bottom samples, thereby providing reliable correlation of photographs and recovered samples.

Various modifications and changes may be made with regard to the foregoing detailed description without departing from the spirit of the invention or the scope of the following claims.

I claim:
1. In combination:
means adapted to be lowered to the ocean bottom and including a bucket movable between an open position for engaging said ocean bottom and a closed position for scooping up a sample of said ocean bottom;
a camera carried by said means;
and means for actuating said camera immediately prior to engagement between said bucket and said ocean bottom to obtain a photograph of said sample, said means including a weight, a line suspending said weight beneath said bucket, and switch means connected to said line and operative upon slackening of said line to actuate said camera.

2. In combination:
means adapted to be lowered to the ocean bottom and including a pair of bucket halves movable between open positions for engaging said ocean bottom and closed positions to define a closed bucket for scooping up and recovering a sample of said ocean bottom;
a camera carried by said means within said bucket halves in the center of said bucket and aimed directly downwardly toward said sample;
and means for actuating said camera immediately prior to engagement between said bucket and said ocean bottom to obtain a photograph of said sample.

3. Underwater camera and recovery apparatus comprising:
first and second bucket halves adapted for pivotal movement between open positions for engaging the ocean bottom and closed positions to define a closed bucket for scooping up and recovering a sample of said ocean bottom;
a camera housing fitted between said bucket halves and depending into said bucket;
a camera supported in said housing;
support means pivotally supporting said camera housing and said bucket halves and actuable to pivot said bucket halves to said closed positions;
releasable latch means normally maintaining said bucket halves in said open positions;
means including a release rod depending from said bucket halves and engageable with said ocean bottom to release said latch means;
a pair of hoist cables trained upon said support means for hoisting thereof and for actuation thereof whereby said bucket halves are movable to said closed positions upon release of said latch means;
and camera actuation means including a weight suspended below said bucket halves for actuating said camera immediately prior to engagement between said bucket halves and said ocean bottom to obtain a photograph of said sample.

4. Underwater camera and recovery apparatus comprising:
first and second bucket halves adapted for pivotal movement between open positions for engaging the ocean bottom and closed positions to define a closed bucket for scooping up and recovering a sample of said ocean bottom;
a camera housing fitted between said bucket halves and depending into said bucket;
a camera supported in said housing;
a first sheave fixed to said first bucket half;
a second sheave fixed to said second bucket half;
a first bucket mount fixed to said first bucket half adjacent said second sheave;
a second bucket mount fixed to said second bucket half adjacent said first sheave;
support means pivotally supporting said camera housing, said sheaves, and said bucket mounts;
releasable latch means normally maintaining said bucket halves in said open positions;
means including a release rod depending from said bucket halves and engageable with said ocean bottom to release said latch means;
a pair of hoist cables trained upon said sheaves in opposite directions, respectively, and operative to rotate said sheaves to pivot said bucket halves to said closed positions;
and camera actuation means for actuating said camera to obtain a photograph of said sample.

5. Underwater camera and recovery apparatus comprising:
first and second bucket halves adapted for pivotal movement between open positions for engaging the ocean bottom and closed positions to define a closed bucket for scooping up and recovering a sample of said ocean bottom;
a camera housing fitted between said bucket halves and depending into said bucket;
a camera supported in said housing;
a first sheave fixed to said first bucket half;
a second sheave fixed to said second bucket half;
a first bucket mount fixed to said first bucket half adjacent said second sheave;
a second bucket mount fixed to said second bucket half adjacent said first sheave;
support means pivotally supporting said camera housing, said sheaves, and said bucket mounts;
a pair of hoist cables trained upon said sheaves in opposite directions, respectively, and operative to rotate said sheaves to pivot said bucket halves to said closed positions;
and camera actuation means including a weight suspended below said bucket halves for actuating said camera immediately prior to engagement between said bucket halves and said ocean bottom to obtain a photograph of said sample.

6. Underwater camera and recovery apparatus comprising:
first and second bucket halves adapted for pivotal movement between open positions for engaging the ocean bottom and closed positions to define a closed bucket for scooping up and recovering a sample of said ocean bottom;

a camera housing fitted between said bucket halves and depending into said bucket;

a camera supported in said housing;

a first sheave fixed to said first bucket half;

a second sheave fixed to said second bucket half;

a first bucket mount fixed to said first bucket half adjacent said second sheave;

a second bucket mount fixed to said second bucket half adjacent said first sheave;

support means pivotally supporting said camera housing, said sheaves, and said bucket mounts;

releasable latch means normally maintaining said bucket halves in said open positions;

means including a release rod depending from said bucket halves and engageable with said ocean bottom to release said latch means;

a pair of hoist cables trained upon said sheaves in opposite directions, respectively, and operative to rotate said sheaves to pivot said bucket halves to said closed positions;

and camera actuation means including a weight suspended below said bucket halves for actuating said camera immediately prior to engagement between said bucket halves and said ocean bottom to obtain a photograph of said sample.

7. Underwater camera and recovery apparatus comprising:

first and second bucket halves adapted for pivotal movement between open positions for engaging the ocean bottom and closed positions to define a closed bucket for scooping up and recovering a sample of said ocean bottom;

a camera housing fitted between said bucket halves and depending into said bucket;

a camera supported in said housing;

support means pivotally supporting said camera housing and said bucket halves and actuable to pivot said bucket halves to said closed positions;

an elongated latch member pivotally carried by one of said bucket halves and receivable within bracket means carried by the other of said bucket halves to maintain said bucket halves in said open positions, said latch member being disengageable from said bracket means upon release of tension in said latch member, the weight of said bucket halves exerting said tension until contact thereof with the ocean bottom;

a link pivotable on said other of said bucket halves from a locking position adjacent said bracket means, to thereby maintain said latch member in engagement with said bracket means, to a release position permitting said latch member to disengage said bracket means;

a release rod depending from said other of said bucket halves and engageable with said ocean bottom for movement against said link to pivot said link from said locking position to said release position;

a pair of hoist cables trained upon said support means for hoisting thereof and for actuation thereof whereby said bracket halves are movable to said closed positions upon release of said latch means;

and camera actuation means for actuating said camera to obtain a photograph of said sample.

8. Underwater camera and recovery apparatus comprising:

first and second bucket halves adapted for pivotal movement between open positions for engaging the ocean bottom and closed positions to define a closed bucket for scooping up and recovering a sample of said ocean bottom;

a camera housing fitted between said bucket halves and depending into said bucket;

a camera supported in said housing;

support means pivotally supporting said camera housing and said bucket halves and actuable to pivot said bucket halves to said closed positions;

a pair of hoist cables trained upon said support means for hoisting thereof and for actuation thereof whereby said bucket halves are movable to said closed positions upon release of said latch means;

and means for actuating said camera immediately piror to engagement between said bucket halves and the ocean bottom to obtain a photograph of said sample, said means including a weight, a line suspending said weight beneath said bucket, and switch means connected to said line and operative upon slackening of said line to actuate said camera.

References Cited by the Examiner

UNITED STATES PATENTS

| | | | |
|---|---|---|---|
| 1,320,750 | 11/1919 | Formiglia | 95—44 |
| 1,997,149 | 4/1935 | Lake | 95—11 X |

JOHN M. HORAN, *Primary Examiner.*